United States Patent
Lee

(10) Patent No.: US 8,972,557 B2
(45) Date of Patent: Mar. 3, 2015

(54) TOPIC-BASED COMMUNITY INDEX GENERATION APPARATUS AND METHOD AND TOPIC-BASED COMMUNITY SEARCHING APPARATUS AND METHOD

(75) Inventor: Jihyun Lee, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 179 days.

(21) Appl. No.: 13/554,257

(22) Filed: Jul. 20, 2012

(65) Prior Publication Data
US 2013/0227104 A1  Aug. 29, 2013

(30) Foreign Application Priority Data

Feb. 28, 2012  (KR) .................. 10-2012-0020559

(51) Int. Cl.
*G06F 15/16* (2006.01)
*G06F 15/173* (2006.01)

(52) U.S. Cl.
USPC .......................................... 709/223; 709/204

(58) Field of Classification Search
CPC .............. H04L 29/08072; H04L 29/06; H04L 12/2458; H04L 12/2419
USPC ........................................................ 709/223
See application file for complete search history.

(56) References Cited

U.S. PATENT DOCUMENTS

| | | | |
|---|---|---|---|
| 2006/0053194 A1* | 3/2006 | Schneider et al. ............ | 709/204 |
| 2008/0097994 A1 | 4/2008 | Teramoto et al. | |
| 2010/0153094 A1 | 6/2010 | Lee et al. | |

FOREIGN PATENT DOCUMENTS

| | | |
|---|---|---|
| JP | 2009-099088 A | 5/2009 |
| JP | 2010-170173 A | 8/2010 |
| KR | 10-2010-0067175 A | 6/2010 |

OTHER PUBLICATIONS

Du, Nan, et al., "Community Detection in Large-Scale Social Networks," In Proc. of WebKDD/SNA-KDD '07, Aug. 12, 2007, pp. 16-25.
Huang, Jianbin, et al., "Shrink: A Structural Clustering Algorithm for Detecting Hierarchical Communities in Networks," In Proc. of CIKM '10, Oct. 25-30, 2010, 10 pp.
Kumpula, Jussi M., et al., "A sequential algorithm for fast clique percolation," Phys. Rev. E, 78(2), Aug. 2008, 8 pp.
Newman, M. E. J., et al., "Finding and evaluating community structure in networks," Phys. Rev. E, 69, Feb. 26, 2004, pp. 026113-1-026113-15.
Padrol-Sureda, Arnau, et al., "Overlapping Community Search for Social Networks," in Proc. of ICDE Conference 2010, 2010, pp. 992-995.
Palla, Gergely, et al., "Uncovering the overlapping community structure of complex networks in nature and society," Nature, Jun. 2005, pp. 814-818, vol. 435.

* cited by examiner

*Primary Examiner* — Tauqir Hussain
(74) *Attorney, Agent, or Firm* — NSIP Law

(57) ABSTRACT

A topic-based community index generation apparatus and method and a topic-based community searching apparatus and method are described. The topic-based community index generation apparatus generates a community index based on a topic that is shared by nodes included in a same community and is differentiated from topics of other communities. The topic-based community index generation apparatus and method effectively search for a desired community in a vast and complex network. In addition, the topic-based community searching apparatus and method effectively search for the desired community based on the topic that is shared by nodes included in the same community and is differentiated from topics of other communities.

22 Claims, 13 Drawing Sheets

(NETWORK G)

(COMMUNITY $C_k$)

TOPIC-BASED COMMUNITY INDEX GENERATION APPARATUS AND METHOD AND TOPIC-BASED COMMUNITY SEARCHING APPARATUS AND METHOD

CROSS-REFERENCE TO RELATED APPLICATION(S)

This application claims the benefit under 35 U.S.C. §119(a) of Korean Patent Application No. 10-2012-0020559, filed on Feb. 28, 2012, in the Korean Intellectual Property Office, the entire disclosure of which is incorporated herein by reference for all purposes.

BACKGROUND

1. Field

The following description relates to a search technology, and more particularly, to an apparatus and method to generate a community index based on a topic and an apparatus and method to search for a community based on a topic.

2. Description of the Related Art

Generally, a network is represented by a number of nodes, and relationships between these nodes are represented via edges. A community refers to a sub-network that is closely connected to a main network, and the number of communities, a size of a community and a relationship between communities defines the network.

With the recent growing interest in social networking, typified by Twitter and Facebook, as platforms for people to share their interests and information, these websites have remarkably increased their influence on politics, culture, and economics. Hence, a variety of services that utilize community information have been developed and, accordingly, the importance of the community search has been increasingly emphasized. For example, a search may be conducted for a community related to a specific disease or a specific patient from a social network. For example, 'PatientLikeMe' is a community for patients suffering from different types of diseases, in which it may be possible to analyze a tendency of disease and a relationship between diseases, to search for suspected cases by use of community information, and to thereby manage diseases.

However, as the network becomes vaster and more complex, the existing search technology has limited capability to effectively search for a community. Thus, there is a need for an apparatus and method to more accurately, automatically, and effectively search for a community.

SUMMARY

In accordance with an illustrative example, a topic-based community index generation apparatus includes a community index generating unit configured to classify communities into community groups based on topics, and to generate a community index that is associated with each of the community groups. The topic-based community index generation apparatus also includes a community index storage unit configured to store the generated community index.

The community index describes at least one of a hierarchical structure among topic categories, information about the community groups in each of the topic categories and a relationship between the community groups.

The community index generation unit further includes a community extracting unit configured to select a seed node for the communities, to detect neighboring nodes of the selected seed node, and to extract the communities, each including the seed node. The community index generation unit also includes a community network managing unit configured to create a community network to include the extracted communities, to determine the topics that represent the communities, and to classify the communities into community groups based on topic categories. The community index generation unit further includes a community index managing unit configured to analyze the hierarchical structure among topic categories, the information about community groups in each of the topic categories and the relationship between the community groups, and to generate a community index that describes at least one of the analyzed hierarchical structure among topic categories, the information about community groups in each of the topic categories, and the relationship between the community groups.

The community extracting unit is further configured to include a seed node selecting unit configured to select the seed node for the communities, a neighboring node detecting unit configured to detect the neighboring nodes of the selected seed node, and a community determining unit configured to determine a community that includes the selected seed node and the detected neighboring nodes.

The seed node selecting unit is configured to select a node excluded from the extracted communities as the seed node.

The seed node selecting unit is configured to select one of a plurality of nodes that are excluded from the extracted communities as the seed node.

The community network managing unit is further configured to include a community network creating unit configured to create the community network to include the extracted communities, a topic determining unit configured to determine the topics that represent the respective communities belonging to the created community network, and a community classifying unit configured to classify the communities, with the determined topics, into groups based on the topic categories.

The topic determining unit is further configured to determine a topic that is shared by nodes belonging to one community and is differentiated from topics of other communities. The topic determining unit is further configured to determine a group of topics of the nodes belonging to the community of a previously established topic ontology database, and to search the group of topics for the topic that is shared by the nodes.

The community classifying unit is further configured to maintain a relationship between communities associated with the same community network and associated with different community groups in different topic categories.

The community index managing unit is further configured to include a hierarchical structure analyzing unit configured to analyze the hierarchical structure among topic categories, and a community group information analyzing unit configured to analyze the information about the community groups in each of the topic categories. The community index managing unit also includes a group relationship analyzing unit configured to analyze the relationship between the community groups in each of the topic categories, and a community index processing unit configured to generate the community index that describes at least one of the analyzed hierarchical structure among topic categories, the information about community groups in each of the topic categories, and the relationship between the community groups.

The hierarchical structure analyzing unit is further configured to recognize the hierarchical structure among topic categories of a previously established topic ontology model database.

The community group information analyzing unit is further configured to identify communities belonging to the community groups in each topic category and to map the identified communities with community group identification information of each topic category to generate a community list. The community list enumerates the communities belonging to each of the community groups in each topic category.

The group relationship analyzing unit is further configured to recognize a relationship between the communities belonging to a community group in a specific topic category and the communities belonging to a community group in a different topic category, and to analyze the relationship between the community groups.

In accordance with another illustrative example, a topic-based community searching apparatus, includes a community searching unit configured to receive search condition information and to search a community index database for a community group that corresponds to the received search condition information. The topic-based community searching apparatus also includes a search result generating unit configured to generate a community search result that comprising community information related to the community group.

The search condition information includes a topic and a search type.

The search type is a first type according to which communities belonging to a community group that is directly related to a topic are searched.

The community searching unit is further configured to search the community index database for a hierarchical structure of the topic included in the search condition information, a community group corresponding to the topic, and communities belonging to the community group corresponding to the topic.

The search type is a second type according to which communities belonging to a community group that is unrelated to a topic and is overlapping communities that are directly related to the topic.

The community searching unit is configured to search the community index database for a hierarchical structure of the topic included in the search condition information, an overlapping community group overlapping with at least one of the communities belonging to a community group corresponding to the topic, and not corresponding to the topic, and the communities belonging to the overlapping community group.

The community information related to the community group includes a community list of communities belonging to the community group and information of each community in relation to other communities.

In accordance with another illustrative example, a topic-based community index generation method, includes selecting a seed node for a community, detecting neighboring nodes of the seed node and extracting communities, wherein each community includes the seed node, creating a community network to include the communities, and determining topics representing the communities, and classifying the communities into groups based on topic categories. The topic-based community index generation method also includes generating a community index associated with each community groups.

The topic-based community index generation method further includes configuring the community index to describe at least one of a hierarchical structure among topic categories, information about the community groups in each of the topic categories, and a relationship between the community groups.

In accordance with another illustrative example, a topic-based community searching method includes receiving search condition information and searching a community index database for a community group that corresponds to the search condition information, and generating a community search result comprising community information related to the community group. In accordance with another illustrative example, a computer program embodied on a non-transitory computer readable medium, the computer program configured to control a processor to perform the method previously described.

Other features and aspects may be apparent from the following detailed description, the drawings, and the claims.

Figure 1:
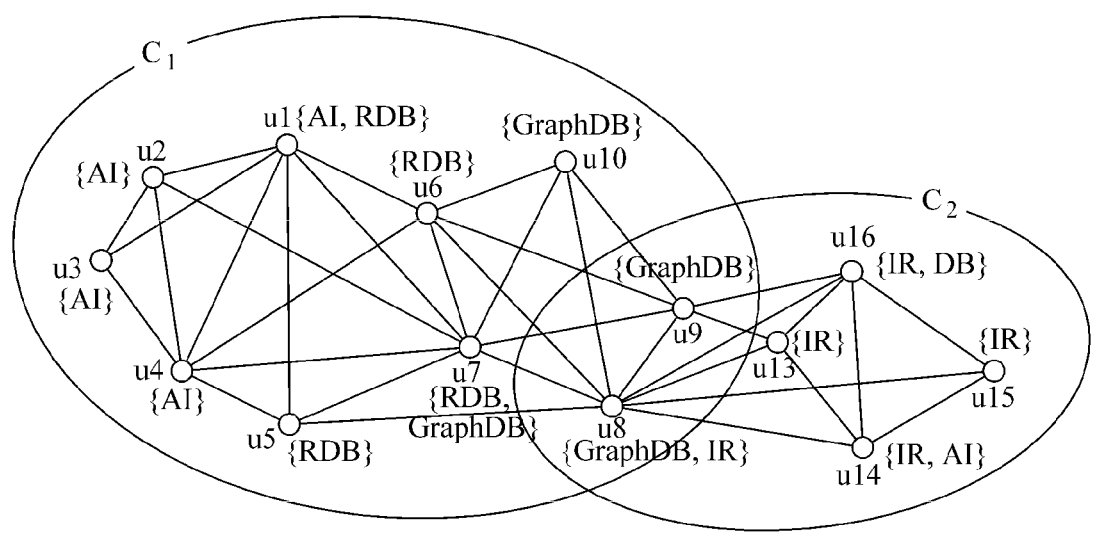
FIG. 1 is a diagram illustrating an example of communities being extracted using a clique percolation algorithm (CPA).

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Generally, nodes on a network have various topics, which define and describe the nodes, and include IP parameters and addresses enabling linkage to other nodes based on the topics. That is, nodes are included in a number of communities depending on the topics. Users generally tend to search for a community that satisfies their personal interests. For example, a topic may be a representative keyword of a node on a network.

There is a limit to effectively extract a community that is suitable to a specific topic because some search methods developed are limited to considering a topology structure of a network, not the diversity of topics that a link has established between nodes.

For example, FIG. 1 is a diagram illustrating an example of communities being extracted using a clique percolation algorithm (CPA). Each of a first community C1 and a second community C2 is made of a plurality of cliques that share at least one node (for example, u1 to u16). Each of the first community C1 and the second community C2 includes a number of communities having various topics. In each of the first and second communities C1 and C2, nodes include topics, for example, AI, DB, RDB, and GraphDB, and form cliques.

Figure 2:
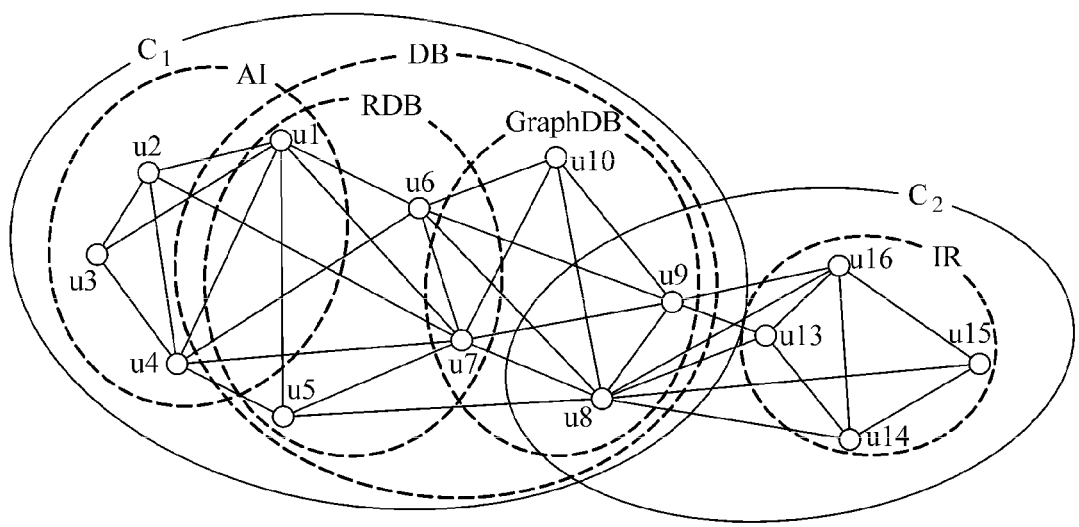
FIG. 2 is a diagram illustrating an example of sub-communities divided from communities according to topics.

FIG. 2 is a diagram illustrating an example of sub-communities divided from communities according to topics. In a first community C1 and a second community C2, each sub-community (represented by dotted lines) includes nodes depending on topics. The nodes include, for example, u1 to u16, and the topics include, for example, AI, DB, RDB, and GraphDB. The sub-communities overlay one another.

In search for a community related to topic GraphDB, conventional search methods are more likely to find undesired communities because there are difficulties in identifying structural/semantic relatedness between communities. Thus, the communities are inevitably subject to further analysis to recognize the structural/semantic relatedness therebetween. For instance, the entire network has to be analyzed to further examine the communities to identify the structural/semantic relatedness between the communities. As a result, query processing may take a considerable amount of time if the network is large.

Therefore, in accordance with an illustrative configuration, topic-based community indices are established in consideration of the diversity of topics of the nodes on the network, a hierarchical relationship among the topics, and structural overlapping between the communities. A community requested by a user is found more accurately and quickly referenced to the community index being previously store.

Figure 3:
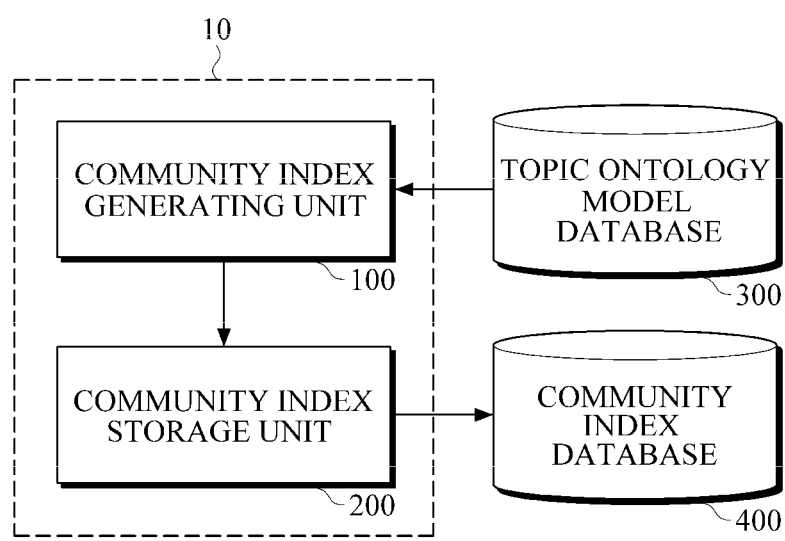
FIG. 3 is a diagram illustrating an example of a topic-based community index generation apparatus.

FIG. 3 is a diagram illustrating an example of a topic-based community index generation apparatus. Referring to FIG. 3, a topic-based community index generation apparatus 10 includes a community index generating unit 100 and a community index storage unit 200.

The community index generating unit 100 classifies the communities into groups according to various topics, and generates a community index related to each group of communities. In this example, the community index describes at least one of a hierarchical structure among topic categories, information about community groups in each topic category, and a relationship between the community groups.

The community index generating unit 100 is configured to recognize a hierarchical structure among the topic categories of a topic ontology model database 300. The recognition of the hierarchical structure, among the topic categories, is further later described.

The community index storage unit 200 stores the community index generated by the community index generating unit 100. For example, the community index storage unit 200 is configured to store the community index in a community index database 400.

Figure 4:
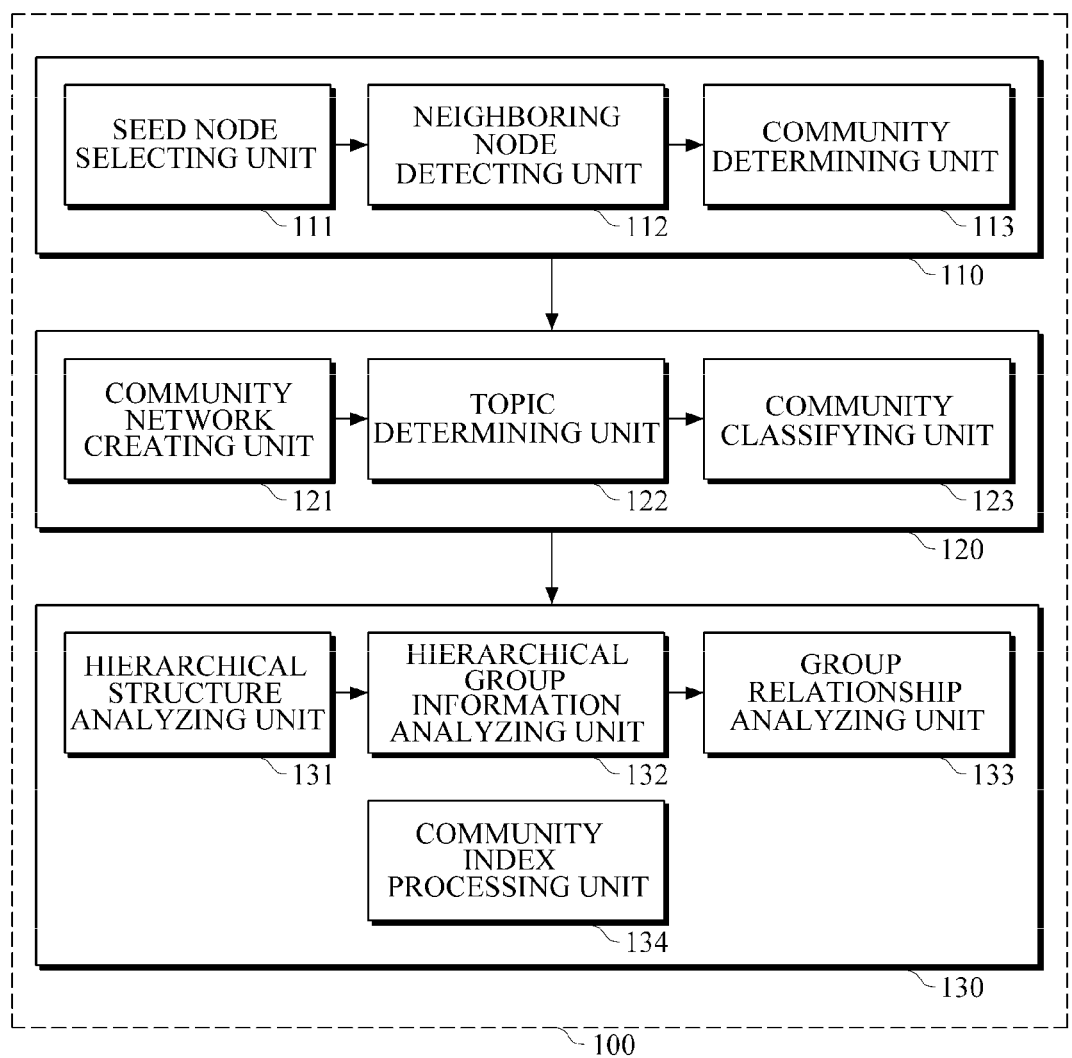
FIG. 4 is a diagram illustrating an example of a community index generating unit of a topic-based community index generation apparatus.

Accordingly, the topic-based community index can be established, defined, or configured by taking into consideration the diversity of the topics of the nodes on the network, the hierarchical relationship between the topics, and a relationship of the structural overlapping between the communities. As a consequence, a community requested by the user can be provided accurately and quickly reference the community index previously stored. FIG. 4 is a diagram illustrating an example of a community index generating unit of a topic-based community index generation apparatus. Referring to FIG. 4, a community index generating unit 100 includes a community extracting unit 110, a community network managing unit 120, and a community index managing unit 130.

The community extracting unit 110 selects a seed node serving as a seed of a community, detects neighboring nodes of the seed node, and extracts communities that include the seed node. For example, the community extracting unit 110 may include a seed node selecting unit 111, a neighboring node detecting unit 112, and a community determining unit 113.

The seed node selecting unit 111 selects a seed node serving as a seed of a community. The seed node selecting unit 111 selects as a seed node a node that does not belong to a community that has been already extracted. If a plurality of nodes are present that do not belong to the previously extracted community, the seed node selecting unit 111 selects a node as a seed node from among the nodes.

Figure 5:
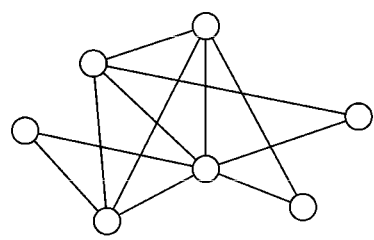
FIG. 5 is a diagram illustrating an example of a configuration to determine a community.
Figure 5:
Figure 5:
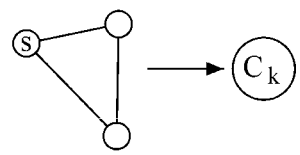

FIG. 5 is a diagram illustrating an example of a configuration to determine a community. Referring to FIG. 5, the seed node selecting unit 111 selects node s that does not belong to any communities that have been already extracted from network G. Node s is determined as a seed node from which a structure of an independent one community is initiated. In this example, the selected seed node may include, at least, k−1 edge degrees because the seed node is to be included in a k-clique that is a basic unit of the community.

The neighboring node detecting unit 112 detects neighboring nodes of the seed node selected by the seed node selecting unit 111. For example, the neighboring node detecting unit 112 uses a tree search algorithm to detect neighbors from the nearest nodes to farthest nodes from the seed node.

The community determining unit 113 determines a community that includes the seed node selected by the seed node selecting unit 111 and the neighboring nodes found by the neighboring node detecting unit 112. Because the community has locality, one maximum community that extends from a specific seed node is determined promptly to effectively manage memory and establish the community index.

In response to the neighboring nodes of the seed node being found, the community determining unit 113 determines a community that includes the seed node and the found neighboring nodes, for example, k-clique $C_k$, as shown in FIG. 5. The community determined by the community determining unit 113 has a unique community ID, and retains an ID list of all nodes included in the community.

The community network managing unit 120 creates a community network to include the communities extracted by the community extracting unit 110, determines topics that represent the respective included communities, and classifies the communities into groups according to topic categories. For example, referring back to FIG. 4, the community network managing unit 120 includes a community network creating unit 121, a topic determining unit 122, and a community classifying unit 123.

The community network creating unit 121 creates a community network to include the communities extracted by the community extracting unit 110. Each of the nodes in the community network is a member of k-clique that serves as a community. An edge represents an overlapping relationship between the cliques. In this example, the overlapping between the cliques indicates that two cliques share at least one node. Two neighboring communities in the community network may share at least one node.

The community network creating unit 121 expands the community network from an initial one community, for example, a clique. The community network may be gradually expanded by detecting a community included in the community network, specifically, nodes belonging to each of cliques and their neighboring nodes.

The communities included in the community network, that is, cliques and another community that shares at least one node with the cliques are found and added to the community network until it is determined that no further community to be added. The completed community network becomes one independent maximal community network.

The topic determining unit 122 determines topics that represent the respective communities included in the community network that are created by the community network creating unit 121. The topic determining unit 122 determines a topic for each of the community when the topic is shared by the nodes belonging to the corresponding community and is differentiated from topics of other communities. In addition, the topic determining unit 122 specifies one or more groups of topics of the nodes belonging to the same community of a topic ontology model database 300, and searches for a topic that is shared by the nodes from each of the groups of topics.

Figure 6:
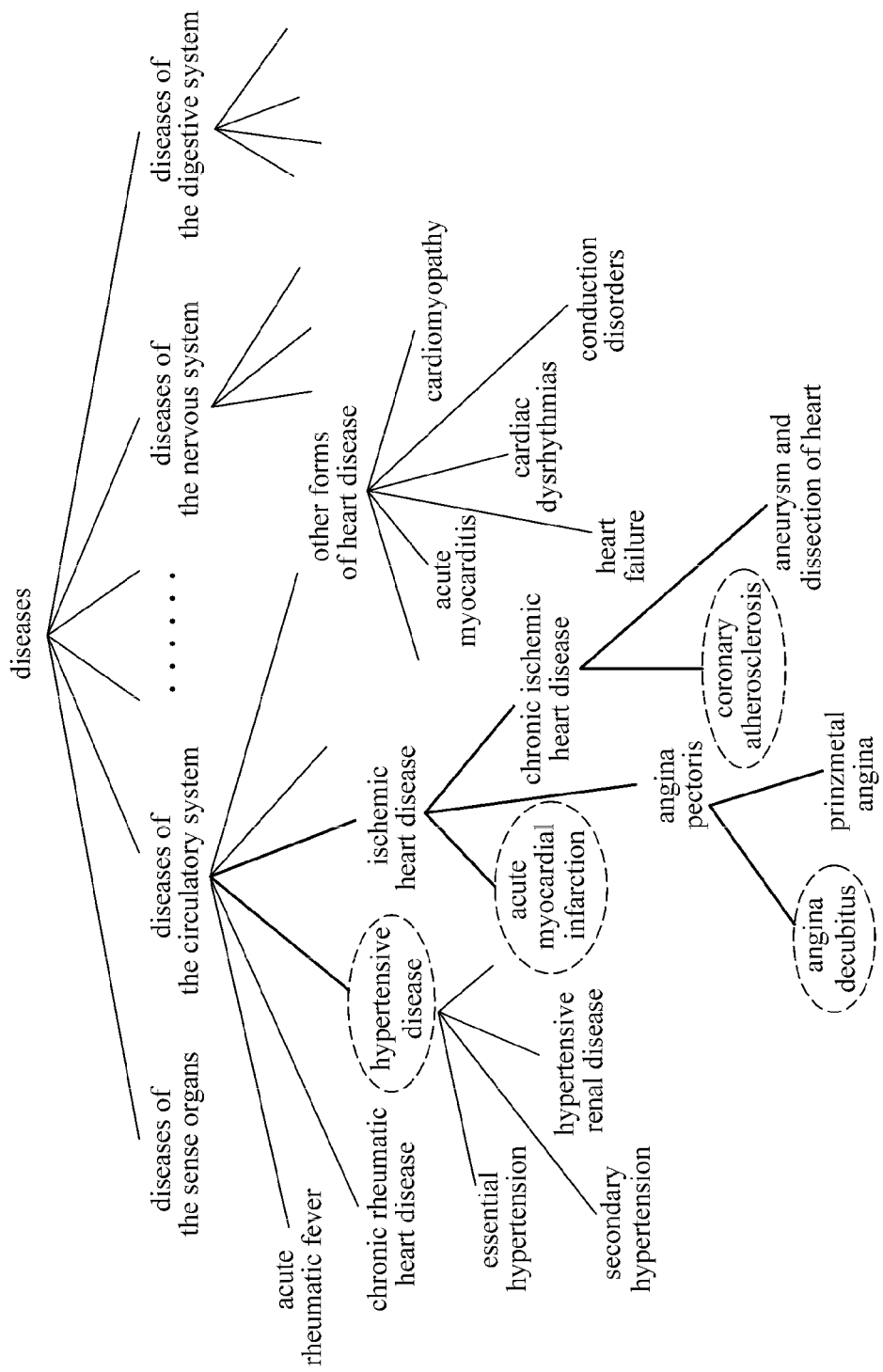
FIG. 6 is a diagram illustrating an example of a topic ontology, which shows a hierarchical structure among diseases.

A topic ontology refers to a representation that describes a semantic hierarchical structure among topics. A parent topic is an upper-level topic that includes a child topic. FIG. 6 is a diagram illustrating an example of a topic ontology, which shows a hierarchical structure among diseases. For example, ischemic heart disease is one of forms of diseases of the circulatory system, and is one of subtopics of the diseases of the circulatory system.

In addition, a topic group $Tc=\{t_1, \ldots, t_k\}$ of k-clique c may be determined as follows. Topic $t$, is the lowest common ancestor topic among topics belonging to a k-combination of a topic set for nodes being included in the clique c, and is found in the topic ontology model database 300. The topic t, does not include any sub-topics that are present in a topic ontology provided in the topic group Tc. Through the above described method, a topic set that is shared by nodes included in the same community, such as a clique, and is differentiated from topics of other communities is determined for each of the communities. For example, under the assumption that a community, such as a clique, includes three nodes n1, n2, and n3, i.e., $c=\{n1, n2, n3\}$, and topics of the respective nodes are t(n1)={acute myocardial infraction(MI)}, t(n2)={angina decubitus(AD), hypertensive disease(HT)}, and t(n3)={coronary atherosclerosis(CA)}, t(n1)×t(n2)×t(n3)= {(MI,AD,CA), (MI,HT,CA)} and the lowest common ancestor topic among three-combination according to the topic ontology shown in FIG. 6 is {'ischemic heart disease', 'diseases of the circulatory system'}. A topic of the clique c may be {'ischemic heart disease'} because 'ischemic heart disease' is a subtopic of 'diseases of the circulatory system'.

The community classifying unit 123 classifies the communities that have their topics determined by the topic determining unit 122 into groups according to topic categories. The community classifying unit 123 maintains a relationship between communities that belong to the same community network, but to different community groups according to the different topic categories.

Figure 7:
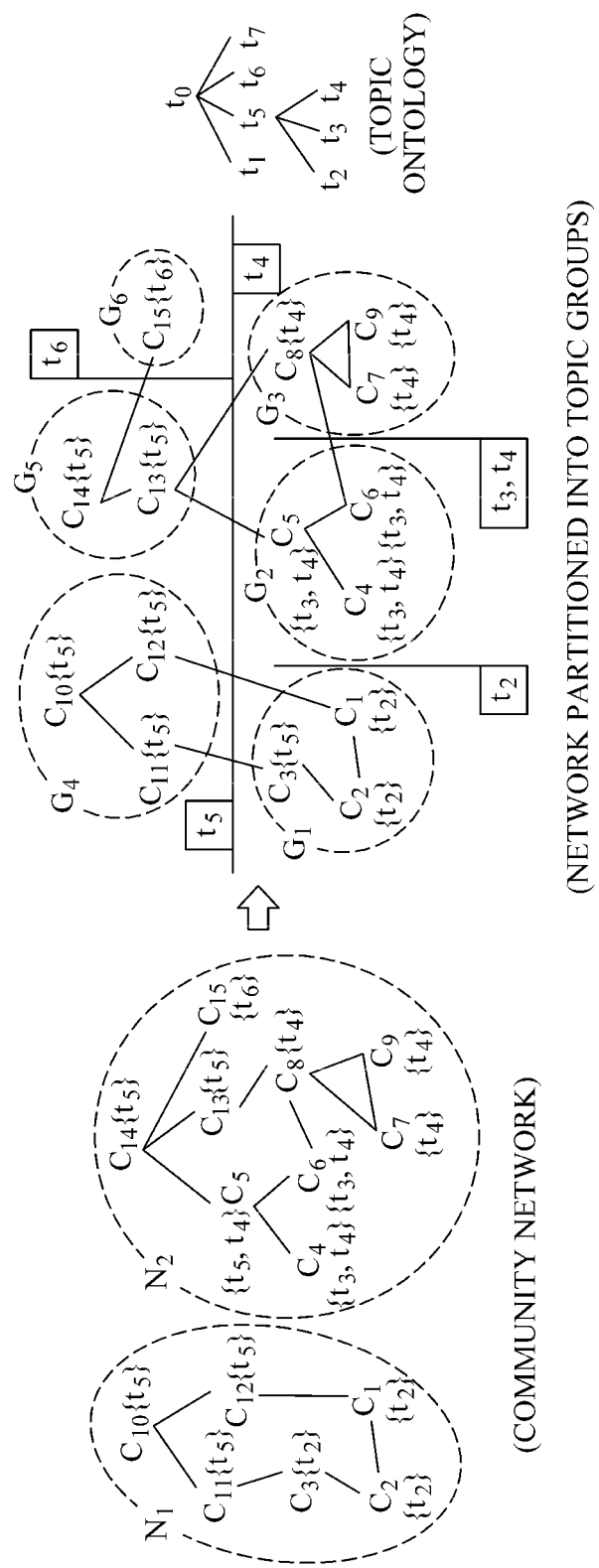
FIG. 7 is a diagram illustrating an example of classification of communities according to topic categories.

FIG. 7 is a diagram illustrating an example of classification of communities according to topic categories. Referring to FIG. 7, communities $C_1, C_2, C_3, C_{10}, C_{11}$, and $C_{12}$ belonging to a community network $N_1$ and communities $C_4, C_5, C_6, C_7, C_8, C_9, C_{13}, C_{14}$, and $C_{15}$ belonging to a community network $N_2$ are classified into six community groups $G_1, G_2, G_3, G_4, G_5$, and $G_6$ according to five topic categories $t_2, t_3, t_4, t_5$, and $t_6$. Furthermore, the relationship between the communities that belong to the same community network and classified into different community groups according to the topic categories is maintained as represented by straight solid lines in FIG. 7.

The community classifying unit 123 may allocate a community group ID to each of the communities, such as cliques, to identify the community group to which the corresponding community belongs. When a new community is added to the community network, a community group ID that has been allocated to another community having the same topic and belonging to the same community network may be allocated to the new community. If there is no community having the same topic as the newly added community, a new community ID may be allocated to the newly added community.

In addition, if the community, that is, a clique, has one or more topics, a topic set of the topics may be considered as one independent topic category, and community groups may be managed according to the topic set. For example, it is shown in FIG. 7 that the communities $C_4, C_5$, and $C_6$ shown in FIG. 7, each having a topic set $\{t_3, t_4\}$, forms an independent community group $G_2$ although they have relationships with the communities $C_8, C_7$, and $C_9$ included in the community group $G_3$ belonging to the topic category $t_4$.

In response to the communities being classified into groups according to the topic categories by the community network managing unit 120, the community index managing unit 130 analyzes a hierarchical structure among the topic categories, community group information of each topic category, and relationships between the community groups, and generates a community index that describes at least one of the analyzed hierarchical structure, community group information, and relationships between the community groups.

For example, referring back to FIG. 4, the community index managing unit 130 includes a hierarchical structure analyzing unit 131, a hierarchical group information analyzing unit 132, a group relationship analyzing unit 133, and a community index processing unit 134.

The hierarchical structure analyzing unit 131 analyzes a hierarchical structure among topic categories. For example, the hierarchical structure analyzing unit 131 recognizes a hierarchical structure among topic categories of the previously provided topic ontology model database 300.

The community group information analyzing unit 132 analyzes community group information of each topic category. The community group information analyzing unit 132 identifies communities that belong to each of the community groups of the respective topic categories, and maps the identified communities with community group identification information for each topic category, thereby generating a community list that enumerates the communities belonging to each of the community groups of the respective topic categories. For example, the community group identification information of each topic category may be a community group ID.

The group relationship analyzing unit 133 analyzes a relationship between the community groups that are grouped according to topic categories. For example, the group relationship analyzing unit 133 identifies a relationship between the communities corresponding to a community group of a specific topic category and the communities corresponding to another community group of a different topic category, and analyzes the relationship therebetween. In this example, the communities may structurally overlap.

The community index processing unit 134 generates a community index that describes at least one of the hierarchical structures among the topic categories that are analyzed by the hierarchical structure analyzing unit 131. The community index also describes the community group information of each topic category that is analyzed by the community group information analyzing unit 132. The community index further describes the relationship between the community groups that is analyzed by the group relationship analyzing unit 133.

The community index generated by the community index processing unit 134 includes a directed acyclic graph (DAG) structure that is formed by link chains between the topic categories. For example, the topic category may have a topic category ID. A sub-topic relationship may be established between the topic categories according to a hierarchical relationship of a topic ontology. According to the sub-topic relationship, a topic set of a lower category connected with an upper category may include a topic set of the upper category or descendent topics of the upper category.

Furthermore, the topic categories may be implemented in such a manner that an inter-group edge between community groups belonging to the respective different topic categories can be maintained. For example, under an assumption that there are two topic categories $t_i$ and $t_j$ which, respectively, include community groups $G_m$ and $G_n$, the community group $G_m$ includes a community $C_x$. The community group $G_n$ includes a community $C_y$. A relationship between the communities $C_x$ and $C_y$ is described as $<G_m, G_n, C_x, C_y>$, and may be defined as the community group $G_m$ in the topic category $t_i$ is connected with the community group $G_n$ in the topic category $t_j$ by the community $C_x$ and the community $C_y$.

Figure 8:
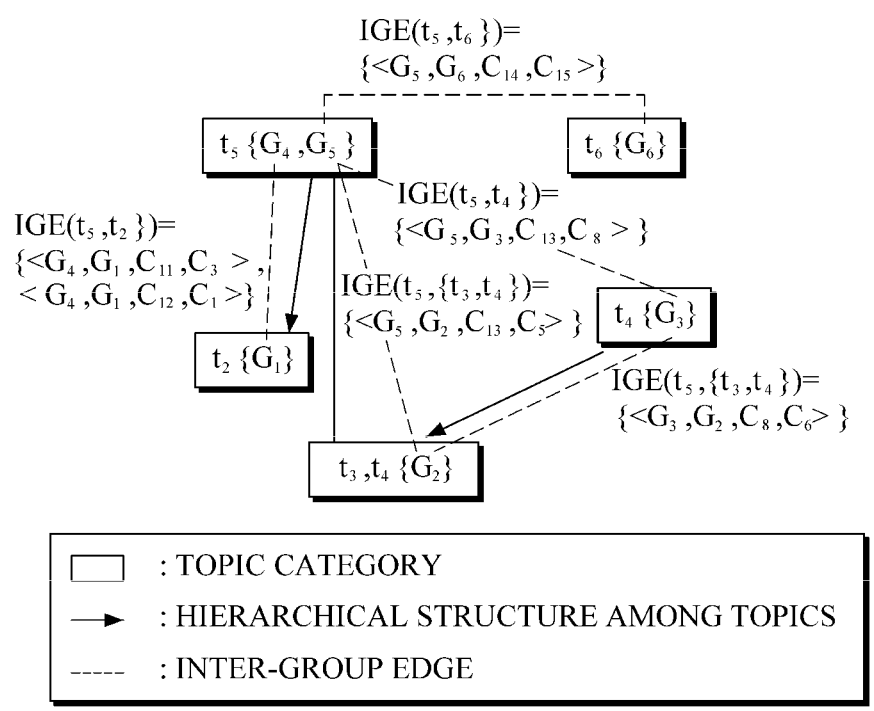
FIG. 8 is a diagram illustrating an example of a community index.

FIG. 8 is a diagram illustrating an example of a community index. In the example shown in FIG. 8, a rectangular box indicates a topic category, and a straight arrow indicates a hierarchical structure between topic categories. A dotted line indicates an inter-group edge between two community groups belonging to different topic categories.

As described above, the topic-based community index generation apparatus may create a topic-based community index by taking into consideration the diversity of topics of nodes on a network, a hierarchical structure among the topics, and a relationship between communities, such as the structural overlapping. The topic-based community index generation apparatus may also provide a user with a desired community more accurately and quickly reference community indices previously stored.

Figure 9:
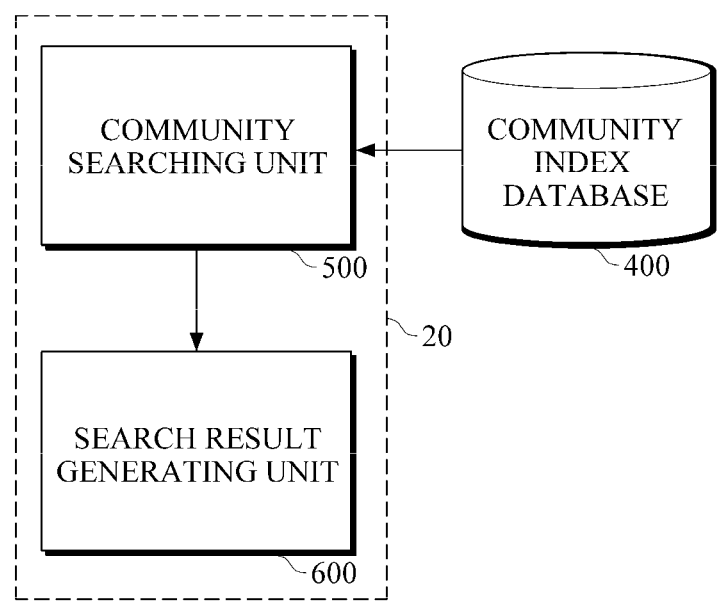
FIG. 9 is a diagram illustrating an example of a topic-based community searching apparatus.

FIG. 9 is a diagram illustrating an example of a topic-based community searching apparatus. Referring to FIG. 9, a topic-based community searching apparatus 20 may include a community searching unit 500 and a search result generating unit 600.

The community searching unit 500 may receive search condition information, and search a community index database 400 for a community group corresponding to the search condition information.

For example, the community searching unit 500 provides a user interface allowing the user to input the search condition information, and receive the search condition information that is a topic-based user query. The community searching unit 500 also searches for a community group corresponding to the input search condition information from the community index database 400.

The search result generating unit 600 generates a community search result that includes community information related to the community group found by the community searching unit 500 and outputs the generated community search result. For example, the community information related to the community group includes a community list of communities associated with the found community group and information about a relationship of each community to the other communities.

In addition, the search result generating unit 600 displays the community search result on a display device (not shown), print it through a printer device (not shown), or output it to another device (not shown) through communications over a network.

The topic-based community searching apparatus, as described above, may search for a community based on a topic that is shared by nodes included in the same community and is differentiated from topics of other communities to effectively search for a desired network in a vast and complex network.

In another example, the search condition information includes a topic and a search type. For example, the search type may be a first type corresponding to the communities in a community group that are directly related to a topic as searched. In the alternative, the search type may be a second type corresponding to the communities in a community group that are not directly related to a topic and overlaps with other communities that are directly related to the topic are searched. For example, if the search type is a first type, the community searching unit 500 searches the community index database 400 for a hierarchical structure of a topic included in the search condition information, a community group corresponding to the pertinent topic, and communities belonging to the pertinent community group. In this example, the search type is selected as a first type and a search word corresponding to a topic category defined by a topic ontology is input as a topic. The community searching unit 500 then searches the community index database 400 for a hierarchical structure among topic categories corresponding to the search word, a community group in the topic category relevant to the search word, and communities belonging to the pertinent community group. In this example, a plurality of search words are input and the community searching unit 500 searches for all communities that have the search word as a topic.

In addition, the topic category, as a target to be searched by the community searching unit 500, may be a topic category in a topic ontology that corresponds to the search word. In the alternative, the topic category may be a topic category having a lower topic set that includes a child topic category of a specific topic category corresponding to the search word.

For example, to search community groups, the community searching unit 500 may perform depth first search (DFS) according to a hierarchical structure among the topic categories and a relationship between the community groups. The community searching unit 500 may start from a community group that is included in the uppermost topic category, which corresponds to the search word.

In this example, a determination is made of whether there is a relationship between two topic categories, and a lower topic category is unconditionally included as a target to be searched. In the case of the search toward an upper topic category, the search is performed on a topic category that does not correspond to the search word. In addition, when community groups including topic categories that have relationship with each other are found, a community search result is generated. The search is repeated with respect to another target topic category to be searched, which still includes a community group that has not yet been searched.

Figure 10:
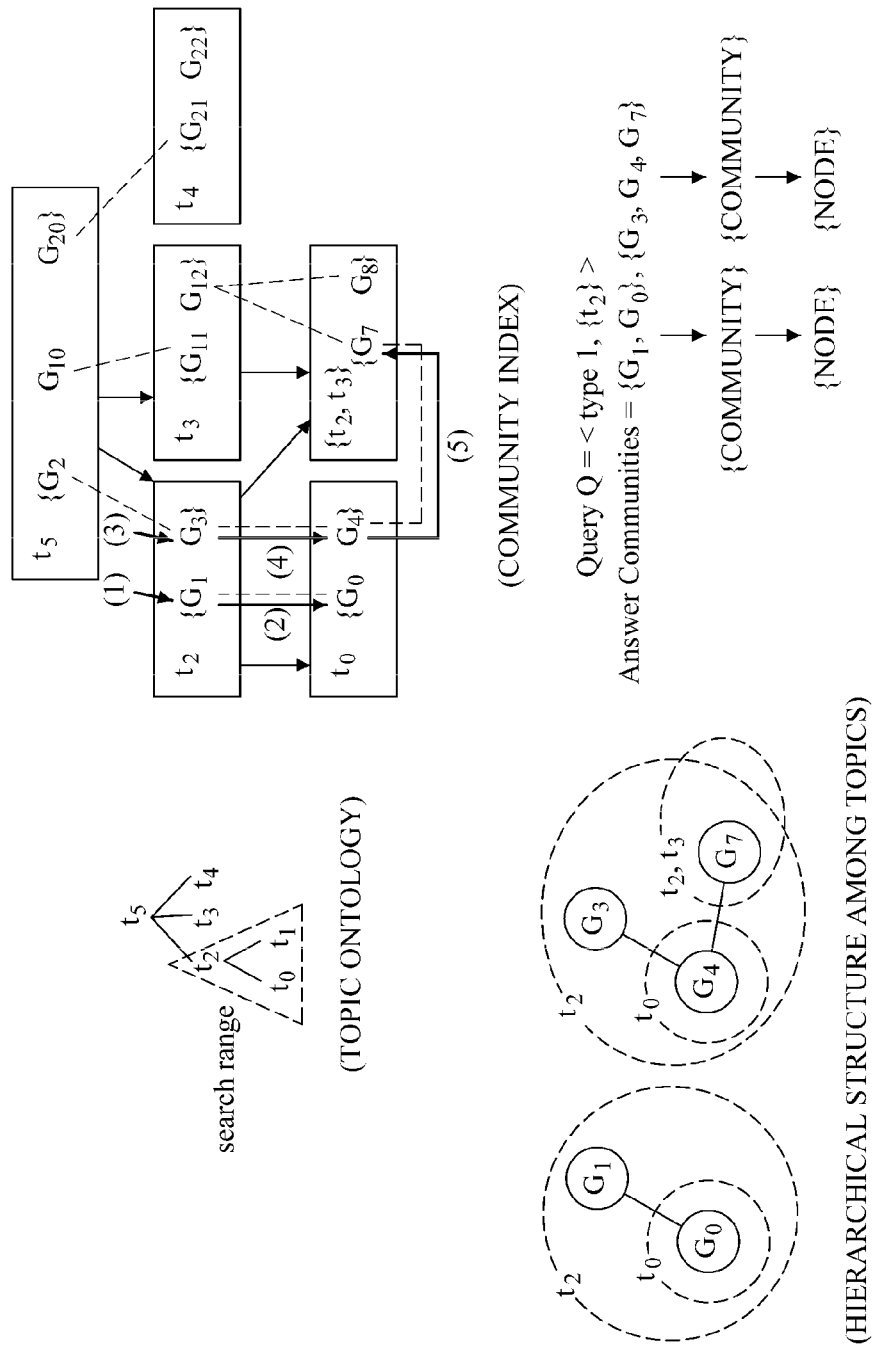
FIG. 10 is a diagram illustrating an example of a configuration to search for communities belonging to a community group directly related to a query topic.

FIG. 10 is a diagram illustrating an example of a configuration to search for communities belonging to a community group directly related to a query topic. Referring to FIG. 10, a first type is selected as a search type and $t_2$ is input as a query topic. In this example, a range of topic categories to be searched includes $t_2$ and corresponding child topic categories $t_0$ and $\{t_2, t_3\}$. In this example, found community groups are $\{G_1, G_0\}$ and $\{G_3, G_4, G_7\}$, and communities belonging to each of the found community groups and found nodes included in each of the communities.

In a case of a second type being searched according to communities belonging to a community group, which is not directly related to a topic and is overlapping with other searched communities that are directly related to the topic, the community searching unit 500 searches the community index database 400 for a hierarchical structure of a topic included in the search condition information. A community group that is overlapping at least one community included in a specific community group that corresponds to a pertinent topic and that has a different topic, and communities belonging to the overlapping community group.

In other words, in this example, an overlapping community group is not directly related to a topic input by a user. In response to a second type selected as the search type and the search word that corresponds to a topic category defined by a topic ontology being input, to search for communities belonging to an overlapping community group, the community searching unit 500 searches the community index database 400 for a hierarchical structure of a topic category that corresponds to the search word. The community index database 400 also searches for an overlapping community group that includes at least one of the communities belonging to a community group, which is included in the topic category corresponding to the search word. Further, the community index database 400 searches for communities that belong to the overlapping community group and exclude the community group that corresponds to the pertinent topic.

In this example, a plurality of search words is input and the community searching unit 500 searches for communities that belong to an overlapping community group that overlaps communities, but not to a community group that corresponds to the relevant topic. In this example, each overlapping community has the search word as a topic.

In addition, a topic category as a target to be searched by the community searching unit 500 may be a topic category that includes a community group related to any community group of a topic category that corresponds to the search word, or a topic category that has a lower topic set including a child topic category of the topic category including the community group related to a community group of the topic category corresponding to the search word.

For example, to search for communities based on a topic, the community searching unit 500 performs DFS according to a hierarchical structure of the topic category and a relationship between the community groups. To search for communities based on the topic, the community searching unit 500 also starts from a community group related to a community group belonging to an uppermost topic category that corresponds to the search word. In this example, it is determined whether there is a relationship between two topic categories, and a lower topic category is unconditionally included as a target to be searched.

In the case of the search toward an upper topic category, the search is performed on a topic category that does not correspond to the search word. In addition, when community groups with topic categories that have a relationship with each other are found, a community search result is generated. The search is then repeated with respect to another target topic category to be searched, which includes a community group that has not yet been searched.

Figure 11:
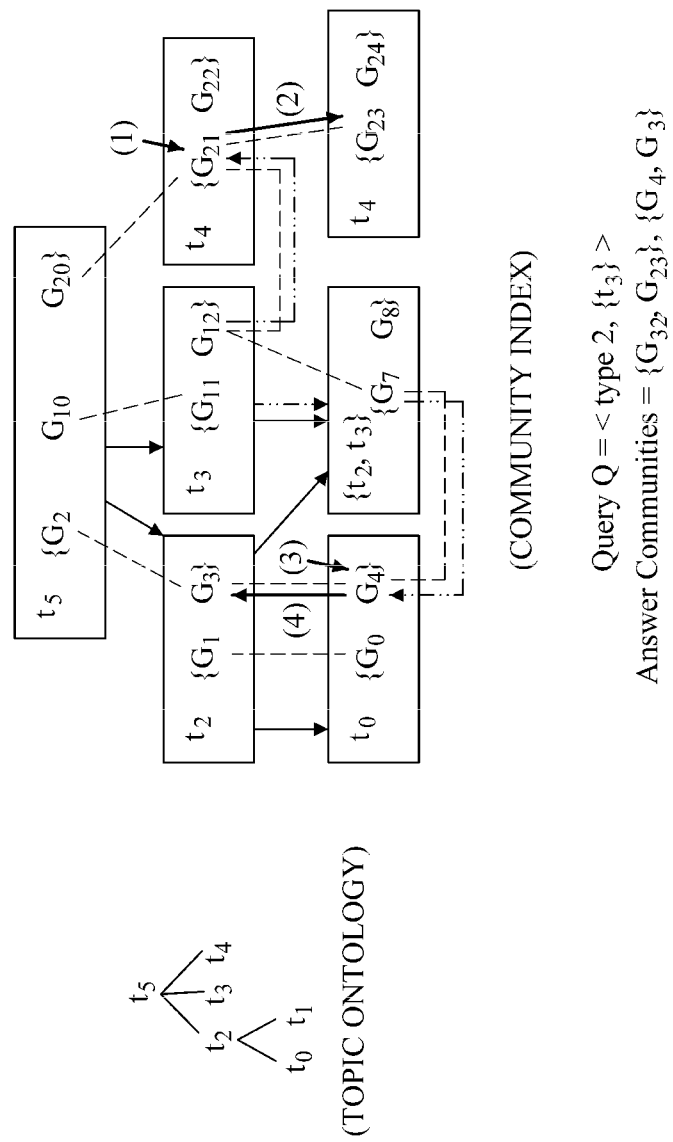
FIG. 11 is a diagram illustrating an example of a configuration to search for communities that are overlapping other communities directly related to a query topic.

FIG. 11 is a diagram illustrating an example of a configuration to search for communities that are overlapping other communities directly related to a query topic. Referring to FIG. 11, a second type is selected as a search type and $t_3$ is input as a query topic. A range of topic categories to be searched includes t3 and associated child topic categories include $\{t_2, t_3\}$. Community groups found are $\{G_1, G_0\}$ and $\{G_3, G_4, G_7\}$. Communities are found that belong to each of the found community groups and nodes included in each of the communities.

Figure 12:
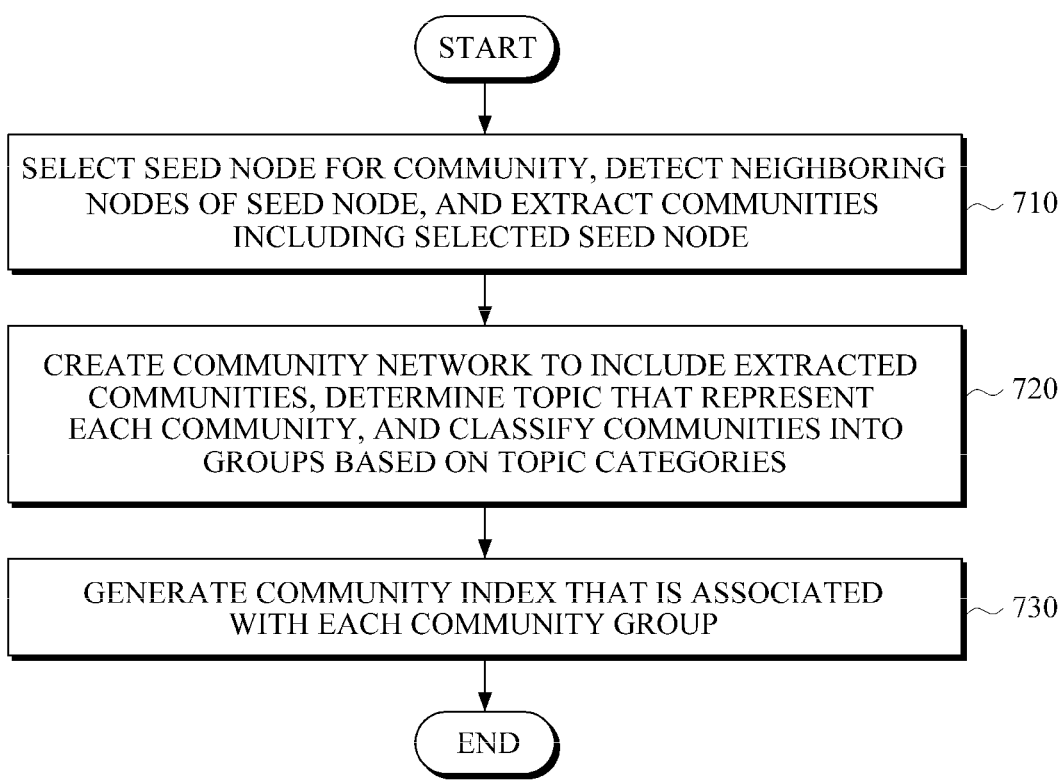
FIG. 12 is a flowchart illustrating an example of a topic-based community index generation method.

As shown and described with reference to FIG. 12, the topic-based community index generation apparatus executes a method to generate a topic-based community index. FIG. 12 is a flowchart illustrating an example of a topic-based community index generation method.

In operation 710, the topic-based community index generation method selects a seed node to serve as a seed to establish a community, and detects neighboring nodes of the seed node. As a result, communities are extracted, each including the seed node. The selection of the seed node, the detection of the neighboring nodes and the extraction of the communities are described above, and, thus, the detailed description thereof will not be reiterated.

In operation 720, the topic-based community index generation method creates a community network to include the extracted communities, determines topics that represent the respective communities, and classifies the communities into groups based on topic categories. The creation of the community network, the determination of topics and classification of the communities are described above, and, thus, the detailed description thereof will not be reiterated.

In response to the communities being classified into groups according to topic categories, in operation 730, the topic-based community index generation method generates a community index associated with each of the community groups.

The community index may describe at least one of a hierarchical structure among topic categories, information about community groups in each topic category, and a relationship between the community groups.

For example, at operation 730, the topic-based community index generation method may analyze a hierarchical structure among the topic categories, information about community group in each topic category, and generate a community index. The community index describes at least one of the analyzed hierarchical structure among the topic categories, the information about the community groups in each topic category, and the relationship between the community groups. The generation of the community index is described above, and, thus, the detailed description thereof will not be reiterated.

According to the above procedures, the topic-based community index generation method may generate a community index based on a topic that is shared by nodes in the same community and is differentiated from topics of other communities, thereby contributing to the effective search for a desired community from a vast and complex network.

Figure 13:
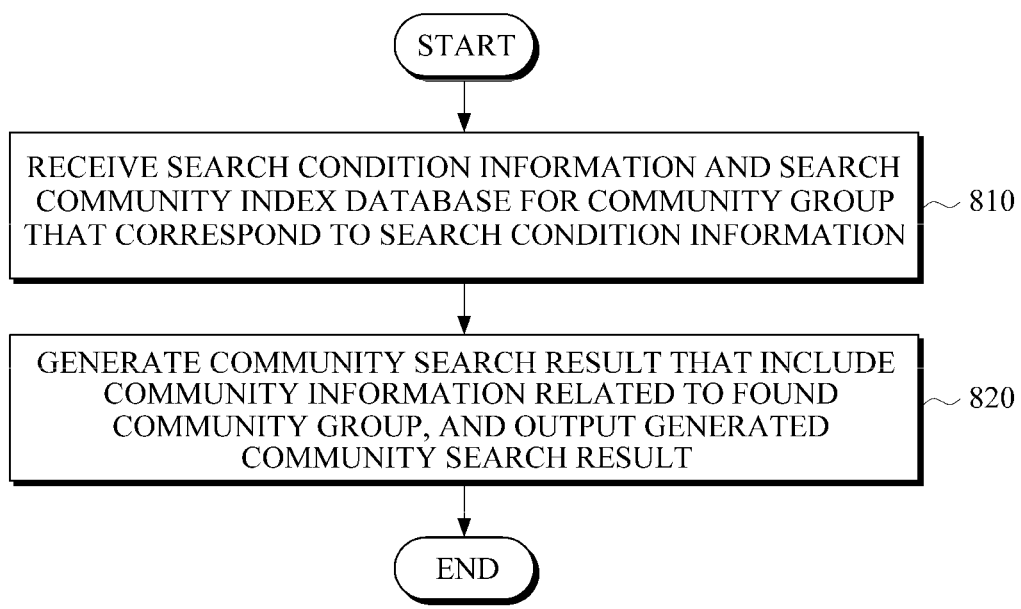
FIG. 13 is a flowchart illustrating an example of a topic-based community search method.

As shown and described with reference to FIG. 13, the topic-based community searching apparatus executes a method to search for a community based on a topic. FIG. 13 is a flowchart illustrating an example of a topic-based community search method.

In operation 810, the topic-based community searching method receives search condition information, and searches a community index database for a community group corresponding to the received search condition information. The search for the community group is described above, and, thus, the detailed description thereof will not be reiterated.

In operation 820, the topic-based community searching method generates a community search result that includes community information related to the found community groups, and outputs a generated community search result indicative thereof. The output of the community search result is described above, and, thus, the detailed description thereof will not be reiterated.

Accordingly, the topic-based community searching method is configured to search for a community based on a topic that is shared by nodes included in the same community and is differentiated from topics of other communities. The topic-based community searching method is configured to effectively search for a desired community in a vast and complex network.

The units described in FIGS. 3, 4, 5, and 9 may be implemented using hardware components. For example, microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

It is to be understood that in the embodiment of the present invention, the operations in FIGS. 12 and 13 are performed in the sequence and manner as shown although the order of some steps and the like may be changed without departing from the spirit and scope of the present invention. In accordance with an illustrative example, a computer program embodied on a non-transitory computer-readable medium may also be provided, encoding instructions to perform at least the method described in FIGS. 12 and 13.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A topic-based community index generation apparatus, comprising:
    a community index generating unit comprising
        a community extracting unit configured to select a seed node for communities, to detect neighboring nodes of the selected seed node, and to extract the communities, each including the seed node,
        a community network managing unit configured to create a community network to include the extracted communities, to determine topics that represent the communities, and to classify the communities into community groups based on topic categories, and
        a community index managing unit configured to analyze a hierarchical structure among the topic categories, information about community groups in each of the topic categories and a relationship between the community groups, and to generate a community index that is associated with each of the community groups and describes at least one of the analyzed hierarchical structure among the topic categories, the information about community groups in each of the topic categories, and the relationship between the community groups; and
    a community index storage unit configured to store the generated community index,
    wherein the community index generating unit and the community index storage unit are implemented by at least one processor.

2. The topic-based community index generation apparatus of claim 1, wherein the community extracting unit is further configured to comprise
    a seed node selecting unit configured to select the seed node for the communities,
    a neighboring node detecting unit configured to detect the neighboring nodes of the selected seed node, and
    a community determining unit configured to determine a community that includes the selected seed node and the detected neighboring nodes.

3. The topic-based community index generation apparatus of claim 2, wherein the seed node selecting unit is configured to select a node excluded from the extracted communities as the seed node.

4. The topic-based community index generation apparatus of claim 3, wherein the seed node selecting unit is configured to select one of a plurality of nodes that are excluded from the extracted communities as the seed node.

5. The topic-based community index generation apparatus of claim 1, wherein the community network managing unit is further configured to comprise
   a community network creating unit configured to create the community network to include the extracted communities,
   a topic determining unit configured to determine the topics that represent the respective communities belonging to the created community network, and
   a community classifying unit configured to classify the communities, with the determined topics, into groups based on the topic categories.

6. The topic-based community index generation apparatus of claim 5, wherein the topic determining unit is further configured to determine a topic that is shared by nodes belonging to one community and is differentiated from topics of other communities.

7. The topic-based community index generation apparatus of claim 6, wherein the topic determining unit is further configured to determine a group of topics of the nodes belonging to the community of a previously established topic ontology database, and to search the group of topics for the topic that is shared by the nodes.

8. The topic-based community index generation apparatus of claim 5, wherein the community classifying unit is further configured to maintain a relationship between communities associated with the same community network and associated with different community groups in different topic categories.

9. The topic-based community index generation apparatus of claim 1, wherein the community index managing unit is further configured to comprise
   a hierarchical structure analyzing unit configured to analyze the hierarchical structure among topic categories,
   a community group information analyzing unit configured to analyze the information about the community groups in each of the topic categories,
   a group relationship analyzing unit configured to analyze the relationship between the community groups in each of the topic categories, and
   a community index processing unit configured to generate the community index that describes at least one of the analyzed hierarchical structure among topic categories, the information about community groups in each of the topic categories, and the relationship between the community groups.

10. The topic-based community index generation apparatus of claim 9, wherein the hierarchical structure analyzing unit is further configured to recognize the hierarchical structure among topic categories of a previously established topic ontology model database.

11. The topic-based community index generation apparatus of claim 9, wherein the community group information analyzing unit is further configured to identify communities belonging to the community groups in each topic category and to map the identified communities with community group identification information of each topic category to generate a community list, wherein the community list enumerates the communities belonging to each of the community groups in each topic category.

12. The topic-based community index generation apparatus of claim 9, wherein the group relationship analyzing unit is further configured to recognize a relationship between the communities belonging to a community group in a specific topic category and the communities belonging to a community group in a different topic category, and to analyze the relationship between the community groups.

13. A topic-based community searching apparatus, comprising:
   a community searching unit configured to receive search condition information and to search for a community group, among a plurality of community groups in a community index database, that corresponds to the received search condition information; and
   a search result generating unit configured to generate a community search result that comprises community information related to the community group,
   wherein the community groups comprise communities represented by topics and classified into the community groups based on topic categories,
   wherein the community index database on an analysis of a hierarchical structure among the topic categories, information about community groups in each of the topic categories an a relationship between the community groups, and the community index database describes at least one of the analyzed hierarchical structure among the topic categories, the information about community groups in each of the topic categories, and the relationship between the community groups, and
   wherein the community search unit and the search result generating unit are implemented by at least one processor.

14. The topic-based community searching apparatus of claim 13, wherein the search condition information includes a topic and a search type.

15. The topic-based community searching apparatus of claim 14, wherein the search type is a first type according to which communities belonging to a community group that is directly related to a topic are searched.

16. The topic-based community searching apparatus of claim 15, wherein the community searching unit is further configured to search the community index database for a hierarchical structure of the topic included in the search condition information, a community group corresponding to the topic, and communities belonging to the community group corresponding to the topic.

17. The topic-based community searching apparatus of claim 14, wherein the search type is a second type according to which communities belonging to a community group that is unrelated to a topic and is overlapping communities that are directly related to the topic.

18. The topic-based community searching apparatus of claim 17, wherein the community searching unit is configured to search the community index database for a hierarchical structure of the topic included in the search condition information, an overlapping community group overlapping with at least one of the communities belonging to a community group corresponding to the topic, and not corresponding to the topic, and the communities belonging to the overlapping community group.

19. The topic-based community searching apparatus of claim 13, wherein the community information related to the community group includes a community list of communities belonging to the community group and information of each community in relation to other communities.

20. A topic-based community index generation method, comprising:
   selecting a seed node for a community;
   detecting neighboring nodes of the seed node and extracting communities, wherein each community includes the seed node;

creating a community network to comprise the communities;

determining topics representing the communities, and classifying the communities into groups based on topic categories;

analyzing a hierarchical structure among the topic categories, information about community groups in each of the topic categories and a relationship between the community groups;

generating a community index associated with each community groups; and configuring the community index to describe at least one of the analyzed hierarchical structure among the topic categories, the information about community groups in each of the topic categories, and the relationship between the community groups.

21. A topic-based community searching method, comprising:

receiving search condition information and searching a community index database for a community group, among a plurality of community groups, that corresponds to the search condition information; and generating a community search result comprising community information related to the community group wherein the community groups comprise communities represented by topics and classified into the community groups based on topic categories, wherein the community index database is generated based on an analysis of a hierarchical structure among the topic categories, information about community groups in each of the topic categories and a relationship between the community groups, and the community index database describes least one of the analyzed hierarchical structure among the topic categories, the information about community groups in each of the topic categories, and the relationship between the community groups.

22. A computer program embodied on a non-transitory computer readable medium, the computer program configured to control a processor to perform the method of claim 20.

* * * * *